United States Patent Office 3,444,720
Patented May 20, 1969

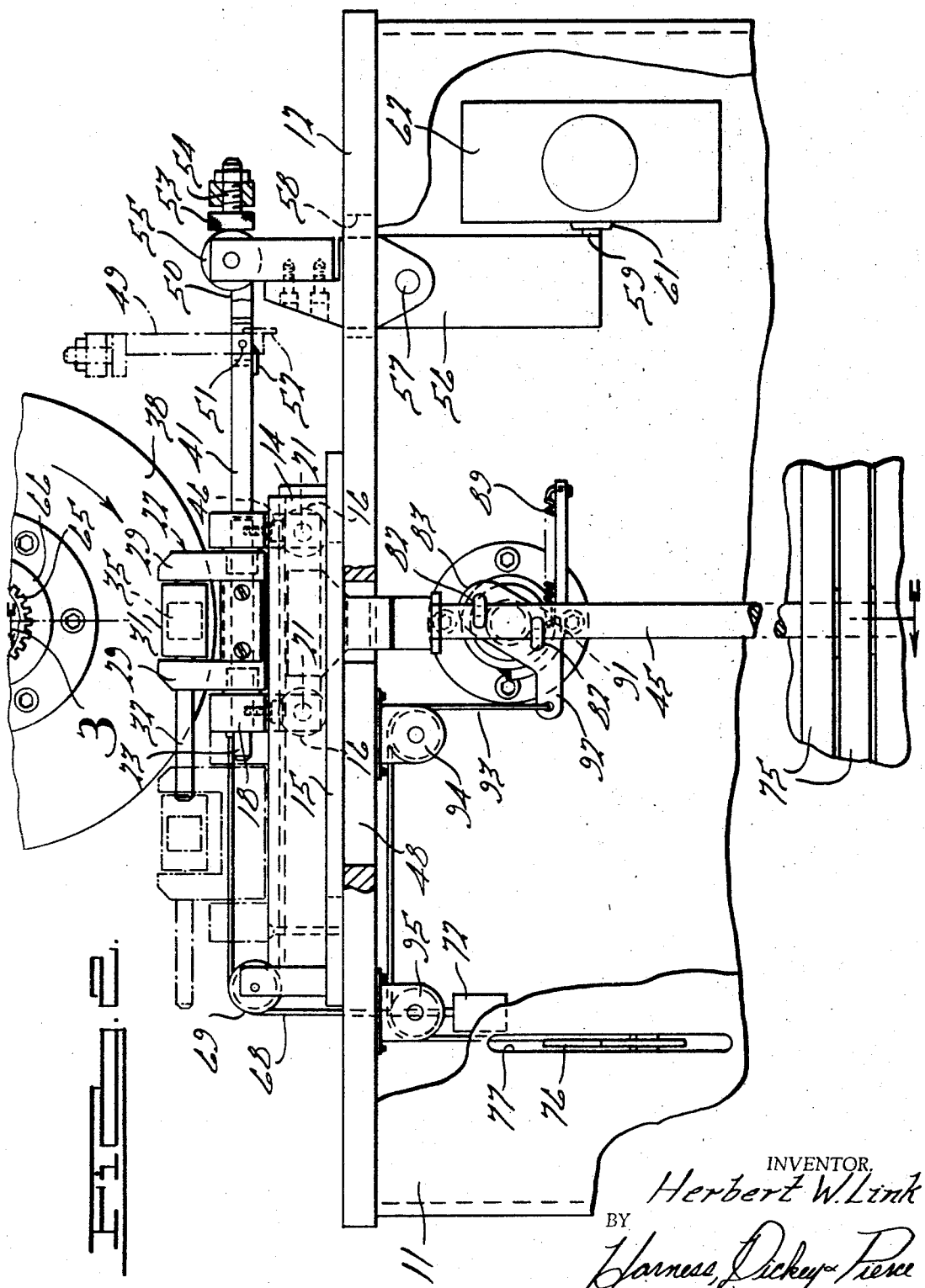

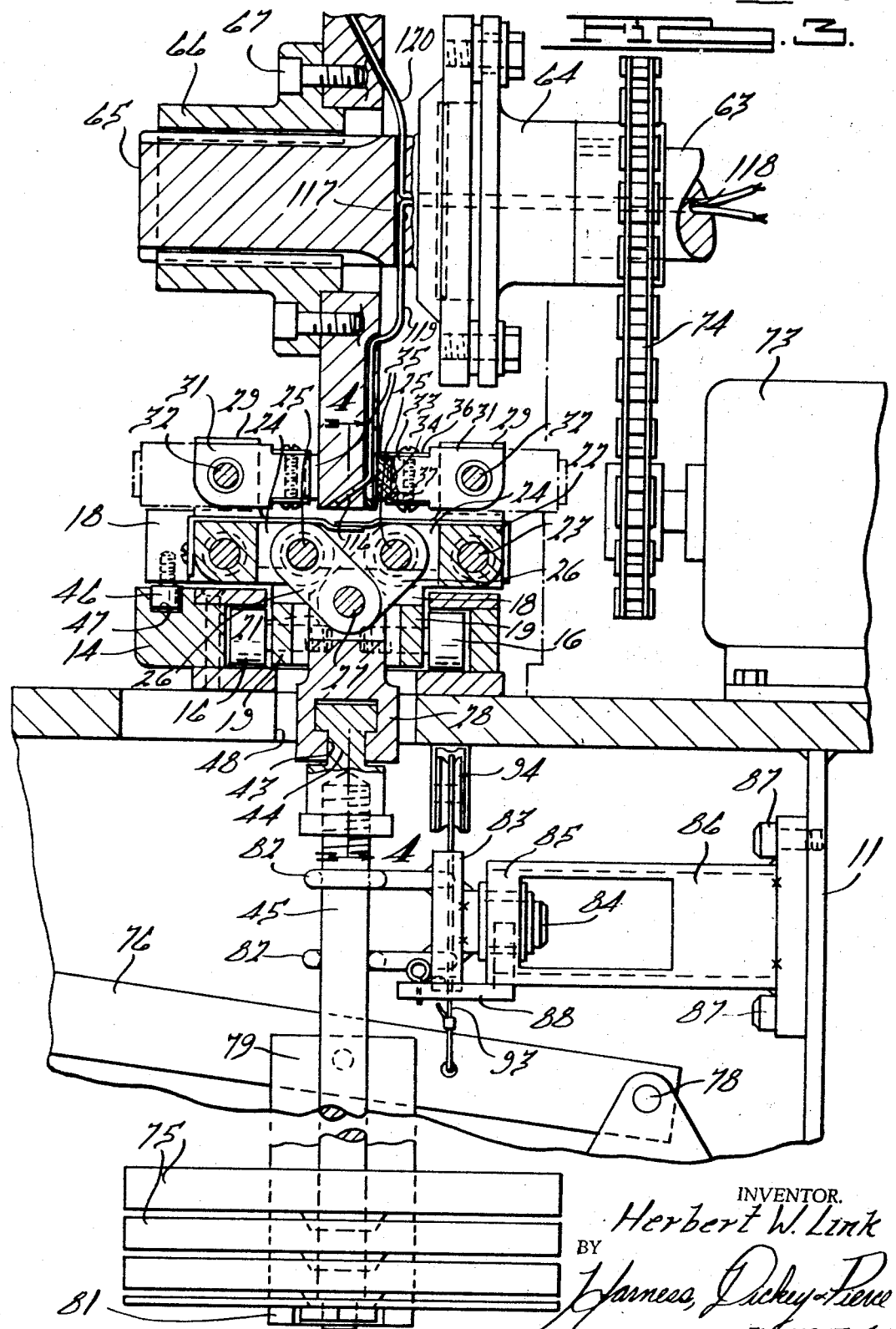

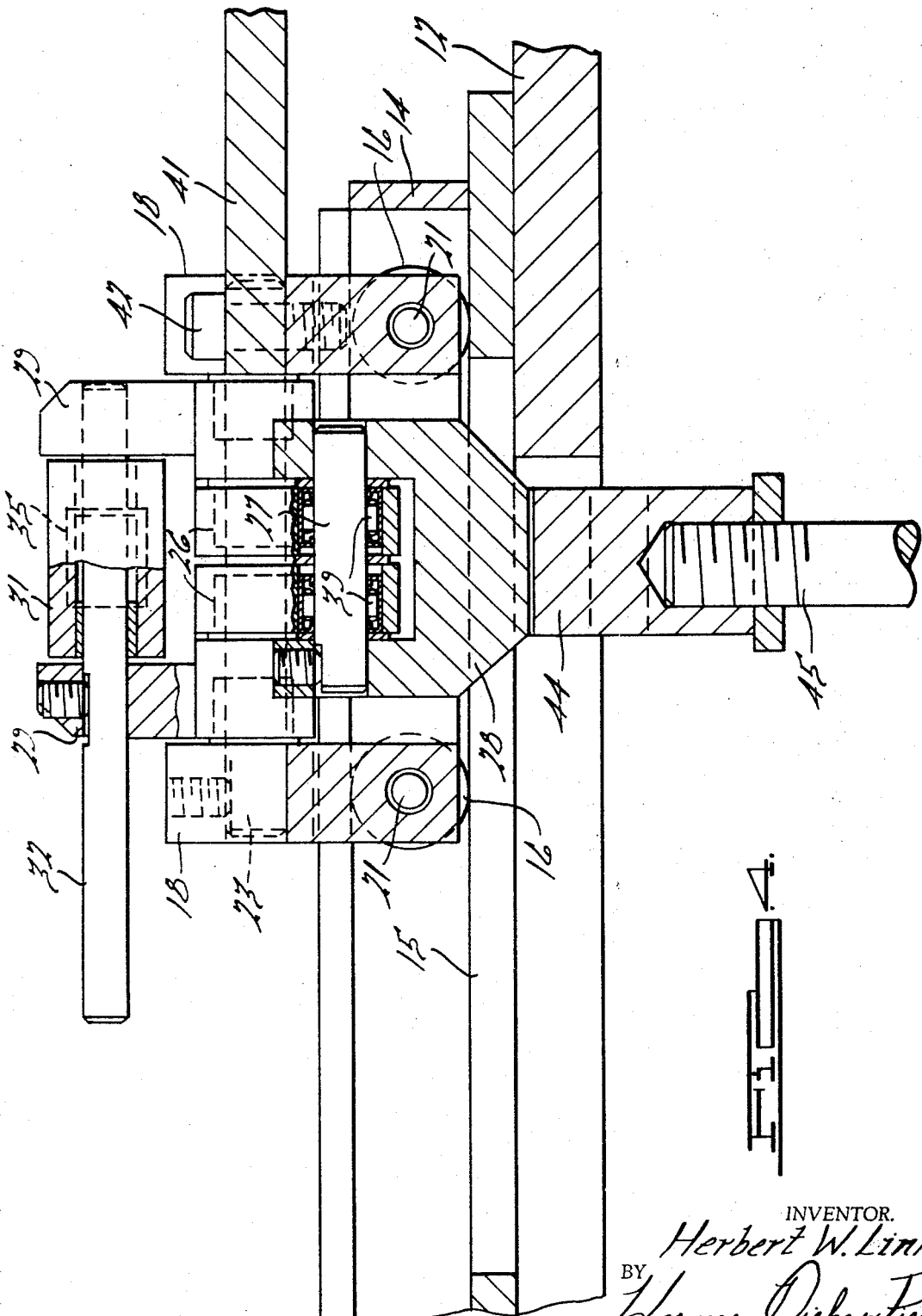

3,444,720
BRAKE LINING TESTING DEVICE
Herbert W. Link, 8330 Sorrento,
Detroit, Mich. 48228
Filed Dec. 6, 1966, Ser. No. 599,606
Int. Cl. G01n 3/56
U.S. Cl. 73—9         11 Claims

ABSTRACT OF THE DISCLOSURE

A brake lining testing device applies pressures to two oppositely disposed test specimens located on opposite sides of a rotatable brake-like disk for testing the friction and wear on the specimens. Weights urge the test specimens into contact with the rotatable disk. As the disk is rotated, the specimens tend to rotate. This movement exerts pressure on a pressure transducer, and the pressure is recorded. A heating system is provided which permits tests to be made at different temperatures.

---

Devices have been employed in the art for testing uniform specimens of brake lining material held against the peripheral surface of a drum with a predetermined pressure. The rotation of the drum applied a force to the material which was accurately measured.

The present invention pertains to a machine having a shaft through which a disk plate is driven and against the opposite faces of which pieces of brake material are forced and to which heat may be applied. A wide range of tests can be run on the material by applying different loads thereto and by varying the heat to simulate different braking conditions. The machine may be so constructed as to accommodate either a drum or disk fixture and the associated elements thereof so as to be available to run a series of tests on either a brake drum or on a disk plate.

Accordingly, the main objects of the invention are: to provide a device for testing two pieces of brake lining material which are applied to opposite sides of a disk plate with a like force; to provide a brake lining testing device with a disk plate and heating means with which braking operations may be accurately simulated; to provide a drive which may be used for a disk or drum brake with means for applying test specimens of brake lining material thereto with a predetermined pressure supplied by a different number of like weights, and in general, to provide a testing device for brake lining materials which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIG. 2 is a front view in elevation of the machine illustrated in FIG. 1, with the heating device removed therefrom;

FIG. 3 is a sectional view of the structure illustrated in FIG. 2, taken on the line 3—3 thereof, and FIG. 4 is an enlarged sectional view of the structure illustrated in FIG. 3, taken on the line 4—4 thereof.

Figure 1:
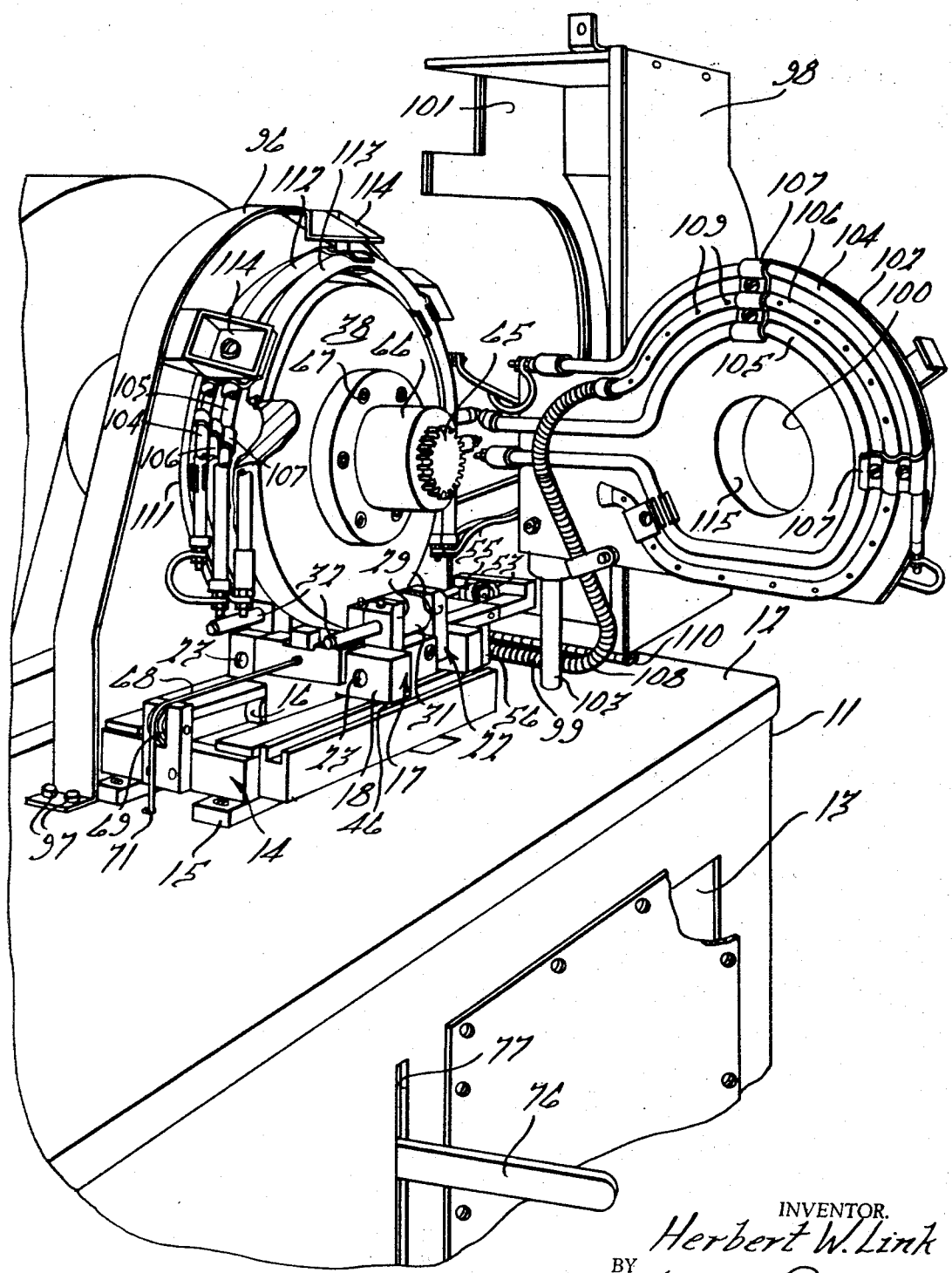
FIGURE 1 is a broken perspective view of a brake lining material testing machine embodying features of the present invention.

In the figures, a base 11 has a top 12 and a hollow interior 13 in which operating elements are mounted. The top 12 carries a base 14 which rests upon a base plate 15 which is engaged by four rollers 16 on a carriage 17. The carriage 17 has two T-shaped elements 18 which are spaced apart and secured in parallel relation to each other by a pair of spaced parallel straps 19. The rollers 16 are secured to the straps by studs 21. Bellcranks 22 are secured between the T-shaped elements 18 on stub shafts 23. Inwardly directed arms 24 of the bellcranks 22 are connected by pins 25 to links 26 which are secured together by a pin 27 and to the end of a clevis 28. Upwardly extending arms 29 of the bellcranks 22 are slotted to receive specimen supporting arms 31 which are secured thereto by pins 32. Each arm 31 has a specimen supporting head 33 provided with an end recess 34 for receiving a specimen 35 which is retained therein by spring elements 36 having knife blade ends 37 which engage opposite edges of the specimen and retain it fixed within the recess. It will be noted that the specimen supporting arms 31 when out of engagement with a disk plate 38 may be swung outwardly 180° about the pivot 32 as shown in dot and dash line in FIG. 3 to permit the specimen to be applied to the head. It will be noted in FIG. 4 that the two links 26 are secured to the pin 27 by needle bearings 39 and that a pulling arm 41 is secured to the right-hand T-shaped element 18 by screws 42 the purpose of which will be explained hereinafter. A downward force on the pin 27 applies a downward force to the pins 25 through the links 26 which rotates the bellcranks 24 toward the faces of the disk plate 38. The pins 32 on the bellcrank arms 29 move the test specimens against opposite faces of the disk plate with like pressure.

The clevis 28 has a T-shaped opening 43 which receives a T-shaped head 44 of a connecting element which has a threaded recess for receiving the threaded end of a rod 45. The left-hand end of the T-shaped element 18, as illustrated in FIG. 3, has a roller 46 secured on the underside thereof to operate in a slot 47 presenting upwardly from the base 14. This accurately guides the carriage in a horizontal path when moved to loading and operating positions. The top 12 has a slot 48 extending therethrough to permit the carriage along with the clevis 28 to be moved to the left, as illustrated in FIG. 2, to the dot and dash line position to permit the arms 31 to be swung outwardly and the test piece examined or replaced. The pulling arm 41, as illustrated in FIG. 2, has an arm 49 with a rectangular slot 50 hinged thereto by a pin 51. The arm is swung upwardly to the dot dash line position when the carriage is moved to the left. When the arm 49 is disposed in extension of the pulling arm 41 it is limited in downward movement by a stop plate 52. In this position a head 53 of a screw 54 on the end of the arm 49 engages a roller 55 on an arm 56 which is secured by a pivot 57 to the underside of the top 12 when extending through a slot 58 therein. A block 59 on the lower end of the arm 56 engages an element 61 on a pressure measuring device 62, which may be a load cell such as that illustrated in patent to the present inventor, No. 3,177,958, issued Apr. 1, 1963, for Supporting and Weighing Device.

A driven shaft 63 has a connecting element 64 which secures a splined stub shaft 65 outwardly thereof in axial alignment therewith. A splined collar 66 is supported on the splined shaft 65 and has the disk plate 38 secured thereto by a plurality of screws 67. The collar and plate will be accurately centered by the specimen pieces 35 when engaging the opposite faces of the disk with like pressure. As illustrated in FIG. 2, the disk plate 38 is rotated clockwise applying a pulling force to the left on the specimens 35 which acting through the pulling arm 41 and the arm 49 will apply a load to the roller 55 which tilts the arm 56 and applies a load to the element 61 of the pressure measuring device 62. A cable 68 is secured to the left-hand T-shaped element 18 to extend over a pulley 69 pivoted to the forward end of the base 14 and extends downwardly through an aperture 71 to a position below the top 12. A weight 72 is attached to the cable end to preload the roller 55 and the pressure measuring device 62 which permits the recording scale to be moved to zero at the beginning of the test. The shaft 63 is driven by a motor 73 through a suitable drive herein illustrated as by a chain drive 74.

The T-shaped head on the rod 45 suspends weights 75 from the clevis 28 and applies a pulling force to the pin 27. One end of a lever 76 extends through a slot 77 in the base 11 with the opposite end secured on a pivot 78 therewithin. A plate 79 has arms 81 extending outwardly at the bottom so as to be disposed beneath the rod 45 for raising the rod and the weights a slight amount sufficient to separate the clevis 28 therefrom. This permits the clevis and the carriage 17 to be moved to the left, to the dot and dash line position illustrated in FIG. 2. To stabilize the rod so that it can be disconnected from the clevis and to retain it in position to be engaged by the clevis, a pair of arcuate fingers 82 are carried on a head 83 which is secured on a pivot 84. The pivot 84 is mounted on a bearing in a head 85 on a support 86 secured to the base 11 by screws 87. The head 85 carries an L-shaped arm 88 to one end of which a spring 89 is secured, the opposite end of the spring being secured in an aperture 91 in the head 83. The spring rotates the head 83 counterclockwise as illustrated in FIG. 2 to have the finger 82 move into engagement with opposite sides of the rod 45. An arm 92 extends from the head 83 to which a cable 93 is secured which passes over a pair of pulleys 94 and 95 supported on the underside of the top 12. Then the end of the cable extends downwardly and is secured to the lever 76, as clearly illustrated in FIG. 3. Upon the downward movement of the lever 76 the arm 92 and the head 83 are moved clockwise to thereby move the fingers 82 out of engagement with the rod 45 after the carriage 17 has been returned to have the clevis 28 engage the T-shaped head 44 on the rod 45. The downward movement of the lever 76 releases the fingers 82 as well as the weights 75.

In operation, the lever 76 is raised to raise the weight 75 and the rod 45 which is clamped by the fingers 82. The arm 49 is pivoted upwardly to permit the carriage 17 to be moved to the left, to the dot dash line position of FIG. 2. The arms 31 are swung outwardly and one of the spring elements 36 of each arm is released to permit a specimen 35 to be applied in the recess 34 thereof after which the spring element 36 is secured in fixed position with the knife blade ends 37 extending into the edge of the specimen. Thereafter, the arms 31 are returned to the position illustrated and the carriage is returned to operative position with the disk plate 38. The arm 49 is swung downwardly in extension of the pulling arm 41 with the head 53 in engagement with the roller 55. The T-shaped head 44 will have moved into the T-slot of the clevis 28. When the lever 46 is moved downwardly the weights 75 are released and the head 83 is rotated clockwise to move the fingers 82 out of engagement with the rod. The weight 72 and the cable 68 preloads the pivoted arm 56 and the pressure responsive device 62. Upon rotation, the disk plate 38 will be accurately centered between the two specimens 35 due to its splined support and equal pressure will be applied to opposite faces of the disk. The specimens which will be engaged with a predetermined like pressure depending upon the number of the weights 75 which are supported by the rod 45. The rotation of the disk produces a pull on the carriage to the left so that the load produced on the specimens can be recorded.

To obtain tests which simulate those occurring during a braking operation when substantial heat is produced on the brake linings and disk plates, a heating system is provided which permits tests to be made at different temperatures. A large number of tests can be made upon the material both by changes in weight and temperature conditions. A back cover 96 is secured to the top 12 by screws 97 and supports a conduit supporting plate 111 adjacent to the disk plate 38. A front conduit supporting plate 102 is hinged on a post 103 and provided with a central aperture 100 aligned with the stub shaft 65. The front and back conduit supporting plates 102 and 111 have a pair of heating elements 104 and 105 and a cooling tube 106 secured thereon by clips 107. The cooling tube is supplied from a flexible tube 108 the fluid through which escapes from the tube 106 through a plurality of apertures 109 on the outer face thereof. A pair of heating elements 112 and 113 are supported adjacent to a portion of the periphery of the disk plate 38 by brackets 114. The back plate 96 and the front plate 102 support the heating elements 104 and 105 and the cooling element 106 adjacent to the front and back faces of the disk plate 38 when the plate 102 is swung to a position adjacent thereto. The brackets 114 support the heating element 112 and 113 adjacent to the peripheral edge of the disk plate 38. The cover 98 is moved to enclose the front and back plates and the heating and cooling elements to confine the temperature produced thereby to an area about the disk plate 38.

After the carriage 17 has been moved to operating position, the front cover 102 is moved in position over the stub shaft 65. The cover plate 102 has a collar 115 about the aperture 100 which extends over the shaft and prevents it from engaging a cover 98. After the plate 102 has been moved to position the cover 98 is moved downwardly onto the top 12 on a hinge 110 to enclose the cover 96, conduit supporting plates 102 and 111, the heating elements and cooling tubes. A pair of thermocouples 116 are mounted within the disk plate 38 having pairs of conductors 119 and 120 extending therefrom into an aperture 117 of the stub shaft 65 and through an aperture 118 in the driving shaft 63. By using the heating elements within the closed cover 98, the disk plate 38 can be heated to any temperature which is continuously recorder by the thermocouples 116 so that the temperature of the disk will be known at all times during the tests. The specimens apply a predetermined pressure to the heated disk and precisely simulate the braking operation on vehicle wheels and comparative tests will be obtained upon the braking material under all conditions of pressure and temperature.

It is to be understood that it is within the purview of the invention to substitute a drum for the disk plate 38 on the shaft 63 and employ one of the arms 29 and an L-shaped element 24 which is secured to the rod 45 to provide a downward force on the specimen. By recording the pulling force on the specimens the same comparison tests under different load and heating conditions are obtainable. With this arrangement the same machine can be employed with an interchange of elements to test the brake lining material for the drum brakes as well as for the disk brakes.

While weights 75 are illustrated for applying various pulling forces on the pin 27 it is to be understood that a fluid actuated device, of the air or hydraulic type, can be substituted therefor. The device is attached to the pin 27 when supported on the machine and the pressure is accurately controlled and automatically applied and recorded.

What is claimed is:

1. In a testing machine, a shaft, a disk on said shaft having substantially parallel faces, a pair of arms, means on said arms for holding test specimens of brake material to be tested against the opposite parallel faces of the disk, means for urging said arms to move the specimens into engagement with opposite faces of the disk, means for rotating said disk, and means for indicating the friction force on said specimens.

2. In a testing machine as recited in claim 1, wherein said arms are supported on a carriage movable longitudinally in a direction in which the disk is rotated relative to said specimens, and said means for indicating the amount of friction on said specimens being engaged by said carriage when moved in said direction by the friction on said specimens.

3. In a testing machine as recited in claim 1, wherein heating means are mounted adjacent to the rear and the periphery of the disk, and a hinged plate having heating means thereon movable to a position adjacent to the front face of the disk.

4. In a testing machine as recited in claim 3, wherein an insulated hood encloses the disk and the heating means.

5. In a testing machine as recited in claim 3, wherein cooling means are provided adjacent to the disk for cooling the disk and the heating means after a test has been run.

6. In a testing machime as recited in claim 3, wherein temperature sensing means is carried by the disk.

7. In a testing device as recited in claim 3, wherein thermocouple means are provided adjacent to the periphery and the opposite faces of the disk.

8. In a testing machine as recited in claim 1, wherein a carriage supports said arms for longitudinal movement in the plane of the disk away therefrom to permit the specimens to be examined and replaced.

9. In a testing machine as recited in claim 8, wherein the arms are loaded by a weighted rod, and further comprising means for supporting the weighted rod to permit the arms to separate therefrom as said carriage is moved.

10. In a testing device as recited in claim 9, wherein said supporting means for the weighted rod is a lever and rod-engaging means actuated by the lever into engagement with the rod when in released position.

11. In a testing machine as recited in claim 1, wherein said disk and specimens are relatively movable axially of the shaft to center the disk between the specimens to have equal pressures applied to both sides of the disk by the specimens.

References Cited

UNITED STATES PATENTS

| | | | |
|---|---|---|---|
| 2,063,244 | 12/1936 | Gulliver | 73—129 |
| 2,944,417 | 7/1960 | Stupp | 73—9 |
| 3,145,807 | 8/1964 | Desvignes et al. | 188—73 |

LOUIS R. PRINCE, *Primary Examiner.*

JEFFREY NOLTON, *Assistant Examiner.*